United States Patent [19]

Rhodes et al.

[11] 4,174,973

[45] Nov. 20, 1979

[54] TRANSPARENT YTTRIA CERAMICS CONTAINING MAGNESIA OR MAGNESIUM ALUMINATE

[75] Inventors: William H. Rhodes, Lexington; F. Joseph Reid, Acton, both of Mass.

[73] Assignee: GTE Laboratories Incorporated, Waltham, Mass.

[21] Appl. No.: 7,097

[22] Filed: Jan. 29, 1979

[51] Int. Cl.$^2$ .............................................. C04B 35/50
[52] U.S. Cl. .................................. 106/73.2; 106/39.5; 106/73.4
[58] Field of Search .................... 106/39.5, 73.2, 73.4; 313/220, 221

[56] References Cited

U.S. PATENT DOCUMENTS

| | | | |
|---|---|---|---|
| 3,545,987 | 12/1970 | Anderson | 106/73.2 |
| 3,640,887 | 2/1972 | Anderson | 106/73.2 |
| 3,873,657 | 3/1975 | Toda et al. | 106/55 |
| 3,878,280 | 4/1975 | Dutta et al. | 264/65 |
| 4,098,612 | 7/1978 | Rhodes et al. | 106/73.2 |
| 4,115,134 | 9/1978 | Rhodes | 106/73.2 |

FOREIGN PATENT DOCUMENTS 2056763  5/1971  Fed. Rep. of Germany .......... 106/73.2

*Primary Examiner*—O. R. Vertiz
*Assistant Examiner*—Mark Bell
*Attorney, Agent, or Firm*—Jerry F. Janssen

[57] ABSTRACT

An article of manufacture comprising a substantially transparent high density polycrystalline yttria-based body consisting essentially of yttria and from 0.1 to 5 wt. % MgO or from 0.1 to 5 wt. % MgAl$_2$O$_4$.

Transparent yttria-based bodies according to this invention are particularly useful as envelopes for high pressure sodium vapor lamps.

5 Claims, No Drawings

TRANSPARENT YTTRIA CERAMICS CONTAINING MAGNESIA OR MAGNESIUM ALUMINATE

BACKGROUND OF THE INVENTION

The present invention relates to transparent yttria ceramics and to methods for the preparation thereof. More particularly, this invention relates to substantially transparent, high density, polycrystalline yttria doped with magnesium oxide or magnesium aluminate and to methods for the preparation thereof.

Ceramics have long been considered desirable materials for use in high temperature applications; however, ceramic materials are generally opaque and cannot be suitably employed where light transmission is desired. Efforts have heretofore been made to obtain transparent ceramics especially for high temperature lamp envelope applications.

For example, U.S. Pat. No. 3,545,987 to Anderson discloses a high-density, yttria-based polycrystalline ceramic containing from about 2 to 15 mole % of an oxide selected from the group consisting of thoria, zirconia, hafnia or combinations thereof. It has been found, however, that in such materials anion interstitial point defects are formed which are unstable in the low-oxygen pressure, high temperature environment of a high-pressure sodium vapor lamp. Consequently, high-pressure sodium lamps having envelopes formed from such materials have been found to be unsatisfactory since they darken rendering the envelope opaque after a few hours of use.

U.S. Pat. No. 3,878,280 describes a method for the preparation of transparent yttria without the use of additives by the use of a vacuum hot pressing operation. This technique is not amenable, however, to the production of thin-wall lamp envelope tubing due to high-pressure gradients along the length of the tube. Consequently, hot pressing is not currently considered a viable process for the formation of transparent polycrystalline tubes.

U.S. Pat. No. 3,873,657 describes the preparation of transparent yttria by employing beryllium compounds as sintering aids. The beryllium compounds employed, however, are toxic; consequently, utilization of such materials in commercial manufacturing operations would be severely handicapped.

SUMMARY OF THE INVENTION

Accordingly, it is an object of the present invention to overcome the disadvantages of the prior art and to provide a substantially transparent yttrium oxide with excellent light transmitting properties.

It is another object of the present invention to provide a substantially transparent yttria-based material which is thermodynamically stable in the high-temperature, low-oxygen pressure environment of a high-pressure sodium vapor lamp.

It is a further object of the present invention to provide a substantially transparent yttria-based material which can be easily and economically fabricated into shapes which are difficult if not impossible to form by conventional hot pressing techniques.

It is another object of this invention to provide a substantially transparent yttria-based material which incorporates a non-toxic sintering aid.

These as well as other and further objects and advantages are accomplished by the present invention which, in one embodiment, provides an article of manufacture comprising a substantially transparent, high density, polycrystalline yttria-based body consisting essentially of yttria ($Y_2O_3$) and containing between about 0.1 to 5 wt.% magnesia (MgO). In an alternative embodiment, the present invention provides an article of manufacture comprising a substantially transparent, high density, polycrystalline yttria-based body consisting essentially of yttria ($Y_2O_3$) and containing between about 0.1 to 5 wt. % magnesium aluminate ($MgAl_2O_4$).

DETAILED DESCRIPTION

This invention makes use of the increased thermodynamic stability of yttria over compositions comprising yttria doped with +4 valence ions such as $Th^{+4}$, $Zr^{+4}$, $Hf^{+4}$, etc. It has been shown for example, that pure yttria is stable in a sodium vapor environment at 1400° C. for 240 hours; it is further known that temperatures in excess of 1625° C. and oxygen pressures of less than $1 \times 10^{-15}$ atm. are required to cause partial reduction and subsequent darkening of yttria. On the other hand, yttria doped with thoria for the purpose of obtaining a transparent material, darkens at about 1600° C. and at oxygen pressures of $1 \times 10^{-15}$ atm. The incorporation of magnesia (MgO) or magnesium aluminate ($MgAl_2O_4$) as a sintering aid in yttria according to the present invention, allows for the fabrication of transparent, high-density, polycrystalline bodies consisting essentially of yttria, with minor amounts, generally less than 5 wt. %, of the sintering aid. The resulting bodies retain the chemical stability of pure yttria toward reduction and darkening in high-temperature, low oxygen pressure environments such as those found particularly in high-pressure sodium vapor lamps.

It is further believed that the incorporation of either MgO or $MgAl_2O_4$ as the sintering aid in yttria, according to the present invention, may contribute to the stability of the compositions toward reducing environments by compensating for any residual or contaminating +4 metal oxide which may be present. To the extent that this effect occurs, the compositions of the present invention offer this advantage over transparent yttria materials sintered with +3 or +4 metal oxide dopants or sintering aids.

The densification of compacted polycrystalline yttria bodies to a final product comprising a substantially transparent body of a density approaching that of pure yttria can be achieved by liquid phase sintering. The addition of small amounts of either MgO or $MgAl_2O_4$ to yttria according to this invention promotes densification of yttria by liquid phase sintering. This means that it is possible to form substantially transparent yttria bodies in the shape of tubes or other intricate forms not possible to produce by conventional hot pressing techniques.

According to one embodiment of the invention, between about 0.1 to 5 wt. % MgO is added to yttria as a sintering aid. In one example of this embodiment, magnesium nitrate was dissolved in methanol and added to the requisite weight of $Y_2O_3$. The mixture was further diluted with methanol and the resulting slurry was wet ball-milled for four hours. The milled mixture was dried in air at about 110° C. and then calcined at 1000° C. in air for one hour to convert the magnesium nitrate to MgO.

The calcined powder was screened through 100-mesh nylon screen and then pressed into green compacted bodies at pressures between 15,000–50,000 psi. The compacted bodies were then sintered in a controlled atmosphere furnace for 1 to 6 hours at temperatures between 1900° and 2200° C. with the preferred schedule being 2 hours at 2100° C. The atmosphere in the furnace during sintering was low enough in oxygen partial pressure to prevent oxidation of the furnace elements and resulting contamination of the sintered body. A partial pressure of oxygen of about $1\times10^{-10}$ atm. at 1900° C. or about $2\times10^{-10}$ atm. at 2150° C. is satisfactory for this purpose, and results in a transparent sintered product. Oxygen partial pressures much less than $1\times10^{-10}$ atm. produce a black sintered product, but transparency can be achieved by subsequently oxidizing the sintered product in air for 5 hours at 1500° C.

Liquid phase sintering of yttria doped with MgO occurs with as little as 0.1 wt. % MgO; however, below this concentration grain growth is relatively slow and the density of the sintered product is only 98.9% that which is theoretically obtainable. On the other hand, at concentrations of MgO above 5 wt. %, copious liquid phase results upon sintering and there is considerable bubble formation and slumping of the compact during sintering. The preferred range of incorporation of MgO occurs between about 0.3 and 1.5 wt. % MgO in the final sintered yttria body; yttria-based bodies which were prepared with magnesia content in this range were sintered to a high density product with good specular and total transmittance properties. Examination of the microstructure of the product in the samples which were prepared with MgO in the preferred concentration range revealed the materials to be highly dense with very little pore entrapment. This degree of densification is surprising in that a dihedral angle of 135° was observed between the second phase and the yttria grain boundary in these sintered products. A dihedral angle of 0°, exhibited by alumina-doped yttria-based bodies for example and indicative of complete wetting of the grain boundaries, is generally associated with successful liquid phase sintering of yttria-based bodies to a high density product. Apparently the MgO liquid phase sintering of yttria occurs by a quite different process than that normally observed and has its own unique sintering and grain growth rates.

In an alternative embodiment of the present invention, between about 0.1 to 5 wt. % $MgAl_2O_4$ is added to yttria as a sintering aid. The magnesium aluminate can be separately prepared and added to the yttria prior to the cold pressing to form the green compacted body, or equimolar amounts of MgO and $Al_2O_3$ may be added to the yttria to later form spinel ($MgAl_2O_4$) during the calcination step.

In one example of this embodiment of the invention, equimolar amounts of finely divided MgO and $Al_2O_3$ were added to the requisite weight of $Y_2O_3$ powder. Methanol was added and the resulting slurry was wet ball-milled for four hours. The milled mixture was dried in air at 110° C. and then calcined at 1300° C. in air for one hour to form the $MgAl_2O_4$ and drive off all volatile compounds. The calcined powder was screened through a 100 mesh nylon screen and then pressed into compacted bodies at pressures between 15,000–50,000 psi. The compacted bodies were sintered in a controlled atmosphere furnace at temperatures between about 1900° and 2200° C. for 1–6 hours followed by annealing for 1–4 hours at about 1930° C. to dissolve a maximum amount of the $MgAl_2O_4$ sintering aid in the yttria to form the solid solution. The furnace atmosphere conditions throughout these steps are those given above for the magnesia-containing yttria materials.

As with yttria doped with MgO, liquid phase sintering of yttria doped with $MgAl_2O_4$ occurs with as little as 0.1 wt. % $MgAl_2O_4$; grain growth at concentrations less than this amount is too slow to make such compositions feasible. At concentrations of $MgAl_2O_4$ above about 5 wt. %, copious liquid phase formation upon sintering results in bubble formation and slumping of the compact during sintering. The preferred range of incorporation of $MgAl_2O_4$ in compositions according to the present invention occurs at between about 0.1% and 1 wt. % $MgAl_2O_4$ in the final sintered yttria body.

Examination of the substantially transparent, high-density polycrystalline product which contained the $MgAl_2O_4$, indicated a dihedral angle of 0° between the sintering matrix and the yttria grain boundaries. Thus, unlike yttria-based bodies sintered with MgO, those sintered with $MgAl_2O_4$ apparently follow normally observed mechanisms for liquid phase sintering.

It appears that the eutectic temperature between $MgAl_2O_4$ and $Y_2O_3$ required for liquid phase sintering is lower than that required for sintering with $Al_2O_3$ (1930° C.). This means that economies in the manufacture of transparent yttria-based bodies may be realized by using $MgAl_2O_4$.

In order to enable one skilled in the art to practice the present invention, the following Examples are provided; however, these Examples are not to be construed as limiting the scope of the invention as hereinafter claimed, but as merely illustrative thereof.

EXAMPLES

Each of the Examples presented in the accompanying Table was prepared according to methods described in detail above. Density measurements of the sintered bodies were measured on an analytical balance using the Archimedes principle. Total transmittance measurements were performed on polished 1 mm thick disc samples, at 0.6 μm wavelength using a Cary Model 14 spectrophotometer.

TABLE

| Ex. | Additive | Wt % Addition | Pressing Pressure Ksi | Sintering Cycles | Annealing Cycles | % Theoretical Density | % Total* Transmittance | % Specular Transmittance |
|---|---|---|---|---|---|---|---|---|
| I | MgO | 0.1 | 50 | 2100° C.-2¼ h | — | 98.4 | — | — |
| II | MgO | 1.0 | 50 | 2100° C.-2¼ h | — | 100.0 | 46.2 | 6.5 |
| III | MgO | 5.0 | 50 | 2100° C.-2¼ h | — | 93.0 | — | — |
| IV | MgO | 5.0 | 50 | 1900° C.-4 h | — | 99.9 | — | — |
| V | MgO | 0.1 | 50 | 1850° C.-2 h / 2150° C.-4 h | — | 98.9 | — | — |
| VI | MgO | 0.7 | 50 | 2110° C.-1½ h | 1850° C.-¼ h | 99.9 | 70.0 | 34.5 |
| VII | MgO | 1.0 | 50 | 2110° C.-1½ h | 1850° C.-¼ h | 98.8 | 69.2 | 48.9 |
| VIII | $MgAl_2O_4$ | 0.1 | 50 | 2100° C.-1½ h | 1925° C.-1 h | 99.2 | — | — |
| IX | $MgAl_2O_4$ | 0.5 | 50 | 2100° C.-2½ h | 1925° C.-1 h | 99.1 | — | — |

TABLE-continued

| Ex. | Additive | Wt % Addition | Pressing Pressure Ksi | Sintering Cycles | Annealing Cycles | % Theoretical Density | % Total* Transmittance | % Specular Transmittance |
|---|---|---|---|---|---|---|---|---|
| X | $MgAl_2O_4$ | 1.0 | 50 | 2100° C.-2½ h | 1925° C.-1 h | 99.0 | — | — |

*Reflected Losses Reduce Theoretical Transmittance to 81.3%

Yttria-based bodies doped with 0.1 to 5 wt. % of MgO or 0.1 to 5 wt. % $MgAl_2O_4$ according to the present invention are substantially transparent, highly dense, materials particularly useful for lamp envelopes. They are particularly suited for use in the high-temperature, low oxygen pressure environment of high-pressure sodium vapor lamps where they demonstrate improved resistance to darkening in the reducing environment found in such lamps.

Yttria based bodies according to the present invention can be fabricated in a variety of shapes not possible by conventional hot pressing techniques, since transparency and densification are achieved by liquid phase sintering at ambient pressures. In the particular case of yttria-based bodies containing 0.1 to 5 wt. % $MgAl_2O_4$ according to this invention, sintering to a dense, transparent body may be achieved at lower temperatures than with most prior art sintering aids.

While there has been described what are at present believed to be the preferred embodiments of this invention, it will be apparent to one skilled in the art that various changes and modifications may be made therein without departing from the scope of the invention as defined by the appended claims.

What is claimed is:

1. A substantially transparent, high density polycrystalline yttria-based body consisting essentially of yttria and about 0.1% to 5% by weight of a material selected from the group consisting of MgO and $MgAl_2O_4$.

2. The yttria-based body according to claim 1 wherein said material is MgO.

3. The yttria-based body according to claim 2 wherein the MgO is present in an amount of between about 0.3% to 1.5% by weight.

4. The yttria-based body according to claim 1 wherein said material is $MgAl_2O_4$.

5. The yttria-based body according to claim 4 wherein the $MgAl_2O_4$ is present in an amount of between about 0.1% to 1% by weight.

* * * * *